(12) United States Patent
Qin

(10) Patent No.: US 10,133,347 B2
(45) Date of Patent: Nov. 20, 2018

(54) NEAR-EYE MICROLENS ARRAY DISPLAY HAVING DIOPTER DETECTION DEVICE

(71) Applicant: BEIJING ANTVR TECHNOLOGY CO., LTD., Beijing (CN)

(72) Inventor: Zheng Qin, Beijing (CN)

(73) Assignee: BEIJING ANTVR TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/471,274

(22) Filed: Mar. 28, 2017

(65) Prior Publication Data
US 2017/0205877 A1 Jul. 20, 2017

Related U.S. Application Data

(63) Continuation of application No. PCT/CN2015/086145, filed on Aug. 5, 2015.

(30) Foreign Application Priority Data

Sep. 29, 2014 (CN) .......................... 2014 1 0513028

(51) Int. Cl.
G02B 27/00 (2006.01)
G06F 3/01 (2006.01)
G02B 27/01 (2006.01)

(52) U.S. Cl.
CPC .......... *G06F 3/013* (2013.01); *G02B 27/0093* (2013.01); *G02B 27/01* (2013.01);
(Continued)

(58) Field of Classification Search
CPC ............ G02B 27/0172; G02B 27/0093; G02B 27/017; G02B 2027/0178; G06F 3/013
See application file for complete search history.

(56) References Cited

U.S. PATENT DOCUMENTS

| 5,204,702 A | 4/1993 | Shapiro | |
|---|---|---|---|
| 2013/0050432 A1* | 2/2013 | Perez | H04N 13/0278 348/47 |
| 2013/0286053 A1* | 10/2013 | Fleck | G09G 3/3208 345/690 |

FOREIGN PATENT DOCUMENTS

| CN | 102761761 A | 10/2012 |
|---|---|---|
| CN | 103605209 A | 2/2014 |

(Continued)

OTHER PUBLICATIONS

International Search Report of PCT/CN2015/086145, dated Nov. 11, 2015.
(Continued)

*Primary Examiner* — Dennis Joseph
(74) *Attorney, Agent, or Firm* — Locke Lord LLP; Tim Tingkang Xia, Esq.

(57) ABSTRACT

A near-eye display includes a human eye-oriented display screen, a microlens array located on the side of the display screen close to human eyes, and an image adjustment unit. The display screen has multiple display regions that are separate from each other. Each display region correspondingly displays a subimage, and the subimages displayed on the display regions combine a complete, gap-free and overlap-free image presented to a user. The microlens array focuses the image displayed on the display screen into a near-eye image that can be clearly seen by human eyes, each microlens being corresponding to one of the display region. The image adjustment unit adjusts in real time a displayed image size of each display region according to a visual acuity state of the user and/or the image adjustment unit moves in real time the position of each display region according to a gaze direction of the user.

8 Claims, 6 Drawing Sheets

(52) U.S. Cl.
CPC ..... *G02B 27/0172* (2013.01); *G02B 27/0179* (2013.01); *G02B 2027/0147* (2013.01); *G02B 2027/0178* (2013.01); *G02B 2027/0181* (2013.01); *G02B 2027/0185* (2013.01); *G02B 2027/0187* (2013.01)

(56) References Cited

FOREIGN PATENT DOCUMENTS

| | | |
|---|---|---|
| CN | 103885582 A | 6/2014 |
| WO | 0106298 A1 | 1/2001 |

OTHER PUBLICATIONS

State Intellectual Property Office of the P.R. china (ISR/CN), "International Search Report for PCT/US2015/086145", China, dated Nov. 11, 2015.

\* cited by examiner

US 10,133,347 B2

NEAR-EYE MICROLENS ARRAY DISPLAY HAVING DIOPTER DETECTION DEVICE

CROSS REFERENCE TO RELATED APPLICATIONS

The present application is a continuation of international application no. PCT/CN2015/086145, filed on Aug. 5, 2015, which claims priority to China Patent Application no. 201410513028.5, filed on Sep. 29, 2014, both of which are hereby incorporated by reference in their entireties.

TECHNICAL FIELD

The present invention relates to a near-eye display, and more particularly to a near-eye display that can adaptively display an image according to the visual acuity state of a human eye.

BACKGROUND

Near-eye displays (NEDs) include head-mounted displays (HMDs) that can project an image directly into eyes of an observer. In use, the distance between the display screen of such a near-eye display and eyeballs is less than 10 cm. Generally, human eyes cannot clearly see the image at such a close distance. However, the near-eye display uses a specially designed lens array to focus an image and project the image onto the human retina. After processing by the visual neural system, a virtual large-scale image is presented in front of the user. Therefore, near-eye displays can be applied to virtual or augmented reality.

In an existing near-eye display device, as shown in FIG. 3A and FIG. 3B, a user wearing a near-eye display according to the present invention may encounter image defects in a near-sighted or far-sighted state.

The so-called "near-sighted state or far-sighted state" herein (that is, "visual acuity state of human eye" hereinafter) may be caused by zooming of human eyes, for example, the near-sighted state caused by focusing at a near position and the far-sighted state caused by focusing at a distant position, or may be caused by aberrations or defects (near-sightedness, far-sightedness, etc.) of eyes of an observer.

FIG. 3A illustrates a case of the near-sighted state, where an image on a display screen 301 is presented to a human eye 303 through a microlens array 302, and an image 304 is formed on the retina. In this case, there are gaps between subimages displayed on display regions (see the view in direction A). FIG. 3B illustrates a case of the far-sighted state, where there are overlaps between subimages displayed on display regions (see the view in direction B).

Therefore, it is necessary to provide a near-eye display having a simple structure and capable of adaptively displaying an image according to the visual acuity state (the near-sighted state or the far-sighted state) of eyes of the user.

SUMMARY

An objective of the present invention is to provide a near-eye display, including a human eye-oriented display screen, a microlens array located on the side of the display screen close to human eyes, and an image adjustment unit. The display screen has a plurality of display regions that are separate from each other. Each display region correspondingly displays a subimage, and the subimages displayed on the display regions is combined as a complete, gap-free and overlap-free image to be presented to a user. The microlens array focuses the image displayed on the display screen into a near-eye image that can be clearly seen by human eyes, each microlens being corresponding to one of the display region. The image adjustment unit adjusts in real time a displayed image size of each display region according to a visual acuity state of the user, so that each display region displays a larger single subimage when a human eye has a short focal length, and each display region displays a smaller single subimage when a human eye has a long focal length, and/or the image adjustment unit moves in real time the position of each display region according to a gaze direction of the user, so that the subimage displayed on each display region can be refracted into a human eye through the microlens array regardless of the gaze direction of the user.

The near-eye display according to the present invention can be directly applied to persons in different visual acuity states, and can adjust the image size according to different diopters of eyes of the user, so as to enable the user to obtain an optimal visual effect. In addition, because of the use of the microlens array, the near-eye display according to the present invention has the advantages of light weight and clear image.

Preferably, it should be understood that the above general description and the following detailed description are both provided for exemplary and explanatory purposes, and should not be construed as limiting the scope of protection of the present invention.

BRIEF DESCRIPTION OF THE DRAWINGS

Further objectives, effects, and advantages of the present invention will become apparent from the following description of the embodiments of the present invention with reference to the accompanying drawings, wherein.

DETAILED DESCRIPTION OF EMBODIMENTS

Figure 1A:
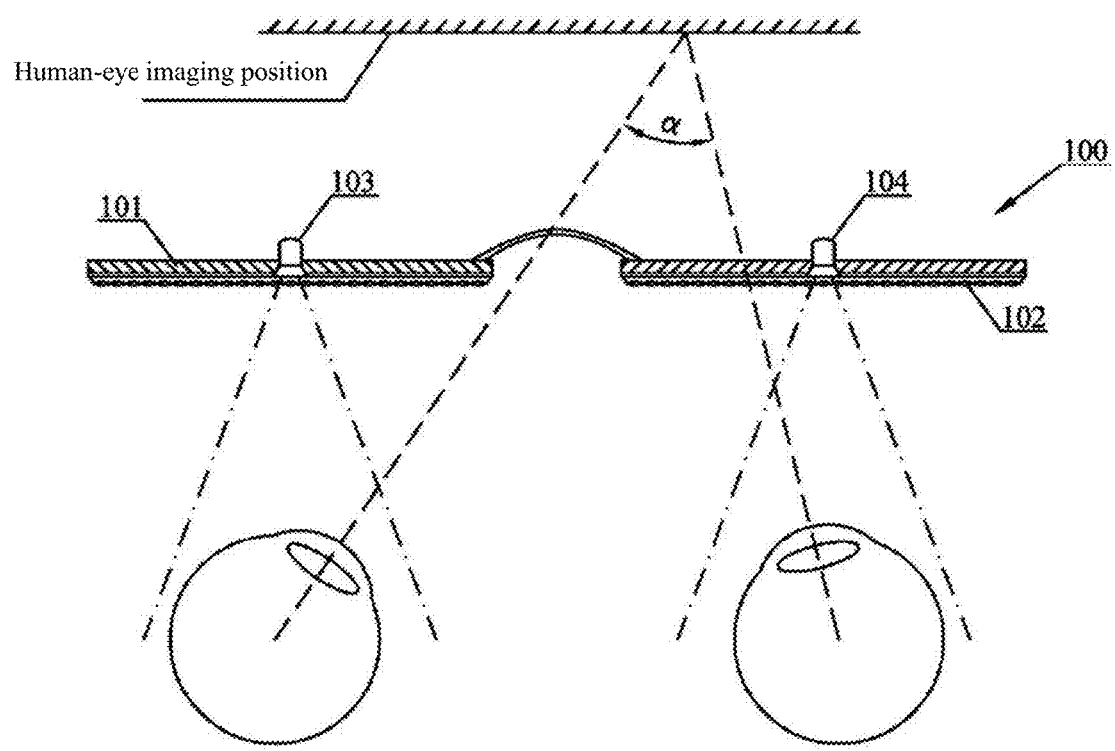
FIG. 1A is a schematic diagram of the main structure of a near-eye display according to the present invention and a use state thereof.

The objectives and functions of the present invention and the method for achieving these objectives and functions will be described in detail with reference to exemplary embodiments. However, the present invention is not limited to the exemplary embodiments disclosed below, but may be implemented in different forms. The essence of this specification is merely for the purpose of helping those skilled in the art to have a comprehensive understanding of the details of the present invention.

The embodiments of the present invention will be described below with reference to the accompanying drawings. In the accompanying drawings, same reference numerals represent same or similar parts.

The present invention provides a near-eye microlens array display, which can perform image adjustment to enable human eyes in different visual acuity states to see a complete, gap-free and overlap-free image.

FIG. 1A illustrates a near-eye microlens array display according to a first embodiment of the present invention.

The near-eye display 100 includes a human eye-oriented display screen 101, a microlens array 102 located on the side of the display screen close to human eyes, and an image adjustment unit.

Figure 1B:
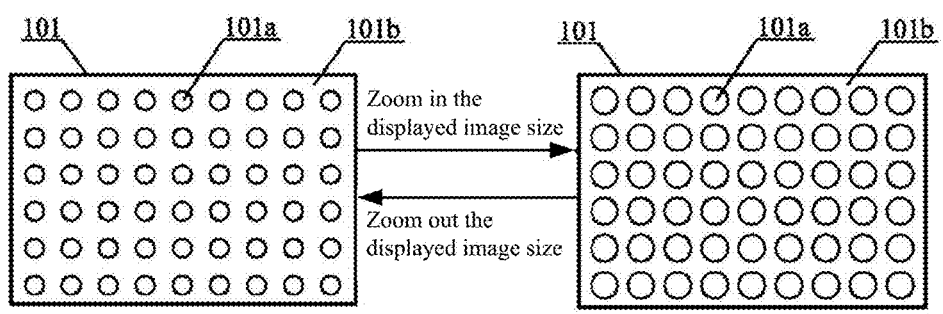
FIG. 1B is a schematic diagram illustrating the adjustment of area parameters of display regions of the display screen of the near-eye display according to the present invention.
Figure 4A:
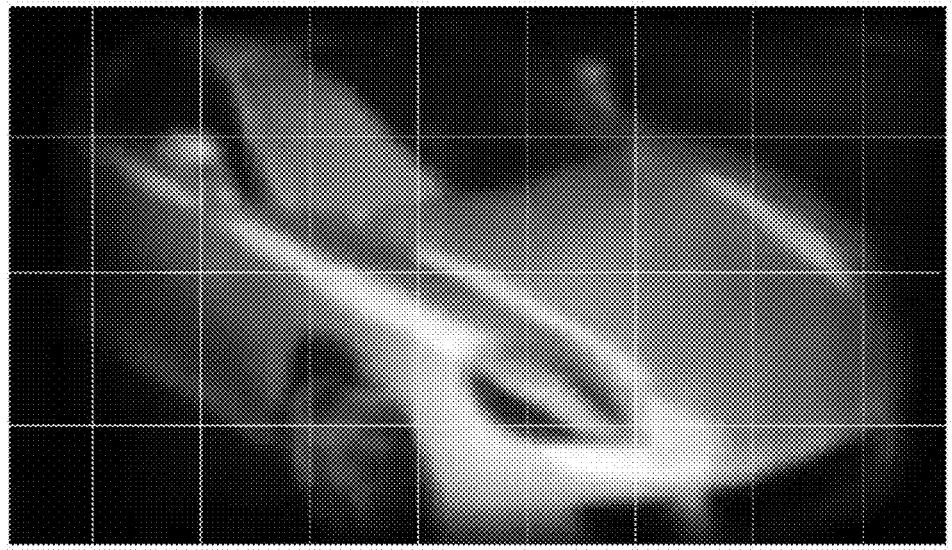
FIG. 4A and FIG. 4B are schematic diagrams respectively illustrating examples of an image displayed on the display screen and an image finally observed by human eyes.
Figure 4B:

The display screen 101 includes a left-eye display screen and a right-eye display screen (for example, an LED display screen). As shown in FIG. 1B, the display screen 101 includes a plurality of pixel units. The pixel units may be divided into a plurality of display regions 101a arranged in an array. Each display region 101a includes a plurality of pixel units and separately displays a single subimage in the complete image, as shown in FIG. 4A. Finally, the subimages are combined to display the complete image, as shown in FIG. 4B. It should be noted that although the image is evenly divided into a plurality of subimages, the display regions are not evenly spaced apart from each other, but instead, display regions closer to the edge of the display screen are more scattered, so as to ensure that light from the display region at the edge can be refracted into human eyes through the microlens.

As shown in FIG. 1A, the microlens array 102 is located on the side of the display screen 101 close to human eyes, and the light-emitting surface of the display screen 101 approximately coincides with the focal plane of the microlens array 102. Therefore, the microlens array 102 converts an image displayed on the display screen into parallel light and projects the parallel light to human eyes, and the parallel light is focused on the retina by the eye into a near-eye image that can be clearly seen by human eyes. The microlens array 102 is formed by an array arrangement of a plurality of microlenses having the same shape and structure. A single microlens may be a plano-convex lens or biconvex lens. The shape of a single microlens may be a circle, square or regular hexagon.

Each microlens corresponds to one of the display region 101a on the display screen 101. The subimages displayed on the display region 101a are imaged through the microlens array and then combined, to present a complete image to the user, as shown in FIG. 4B. The complete image herein refers to a complete, clear, gap-free and overlap-free image. At the edge of the display region 101a, a non-display region 101b that does not display an image may be included or not.

Figure 6A:
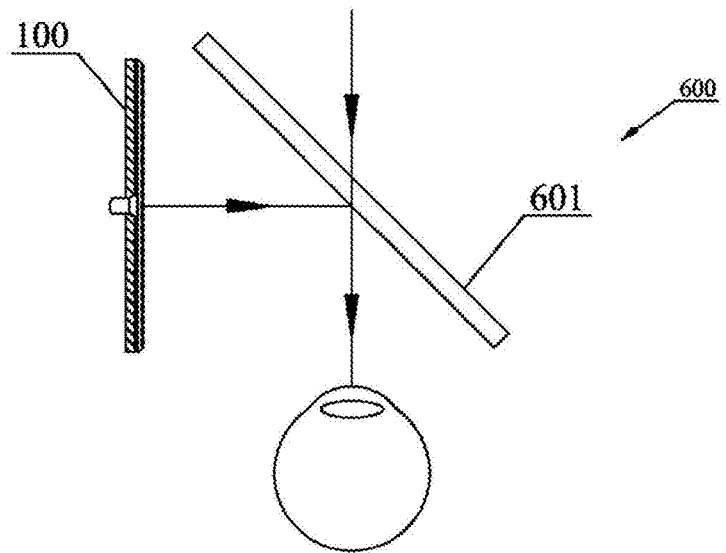
FIG. 6A and FIG. 6B are schematic diagrams of a near-eye display having a reflecting mirror.

Preferably, as shown in FIG. 6A, the near-eye display 100 is placed on one side of human eyes, for example, on the left/right of human eyes or above or below human eyes, and reflects the image to human eyes by using a reflecting mirror 601 disposed in front of human eyes. The reflecting mirror may be an ordinary reflecting mirror or a semi-transmissive semi-reflective mirror. When the semi-transmissive semi-reflective mirror is used, human eyes not only can see the image in the near-eye display 100, but also can see a real scene in front through the semi-transmissive semi-reflective mirror 601, thereby achieving a display effect of augmented reality. In addition, when the semi-transmissive semi-reflective mirror is used, the near-eye display may be fabricated into see-through display glasses.

Figure 6B:
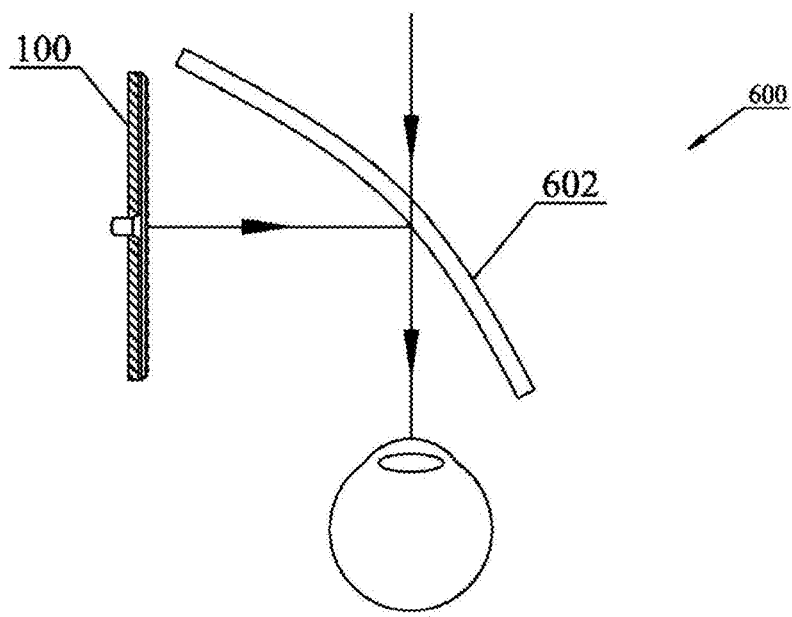

The reflecting mirror 601 may be a planar mirror or a non-planar mirror, for example, a free-form surface reflecting mirror. Preferably, as shown in FIG. 6B, the reflecting mirror 601 is replaced with a semi-transmissive semi-reflective free-form surface mirror 602 having equal thickness. The image in the near-eye display 100 may be enlarged by the semi-transmissive semi-reflective free-form surface mirror 602 and then reflected into human eyes. In this case, the image observed by human eyes is larger than the image in the near-eye display 100, and at the same time, human eyes can still view a normal scene in reality.

The image adjustment unit according to the present invention is configured to adjust the image displayed on the display screen according to gaze directions of human eyes and visual acuity states of human eyes. The two functions will be described in detail below.

1. Adjustment according to the Gaze Directions of Human Eyes

The image adjustment unit according to the present invention can dynamically adjust the positions of the display regions on the entire display screen according to the gaze directions of human eyes.

Figure 2A:
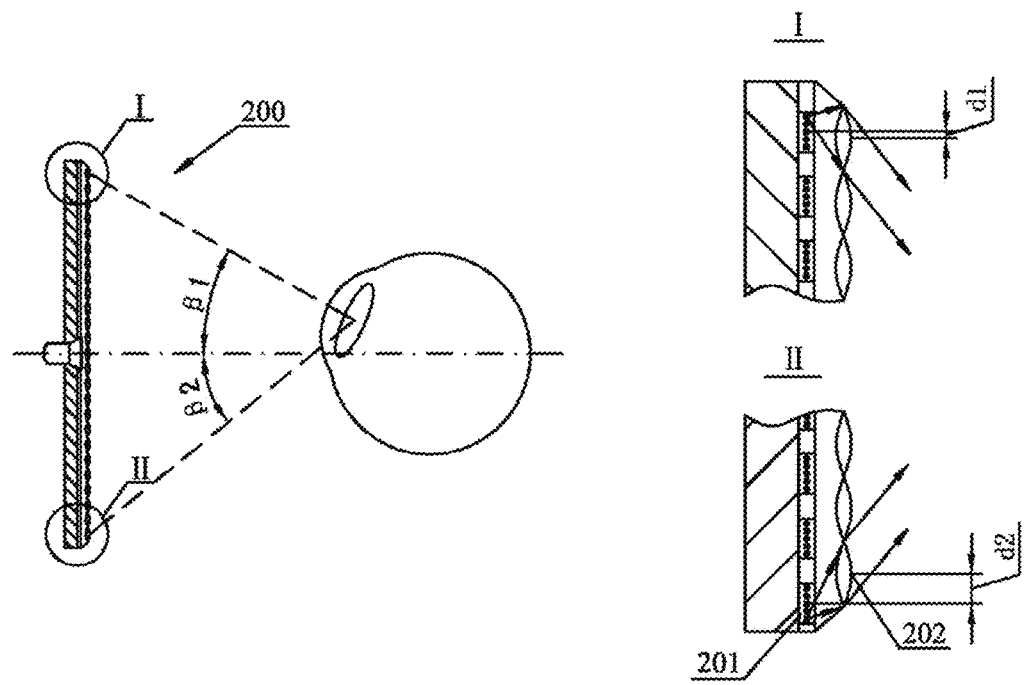
FIG. 2A and FIG. 2B are schematic diagrams illustrating the deviation of display regions of the display screen of the near-eye display according to the present invention along with different positions of human eyes.
Figure 2B:
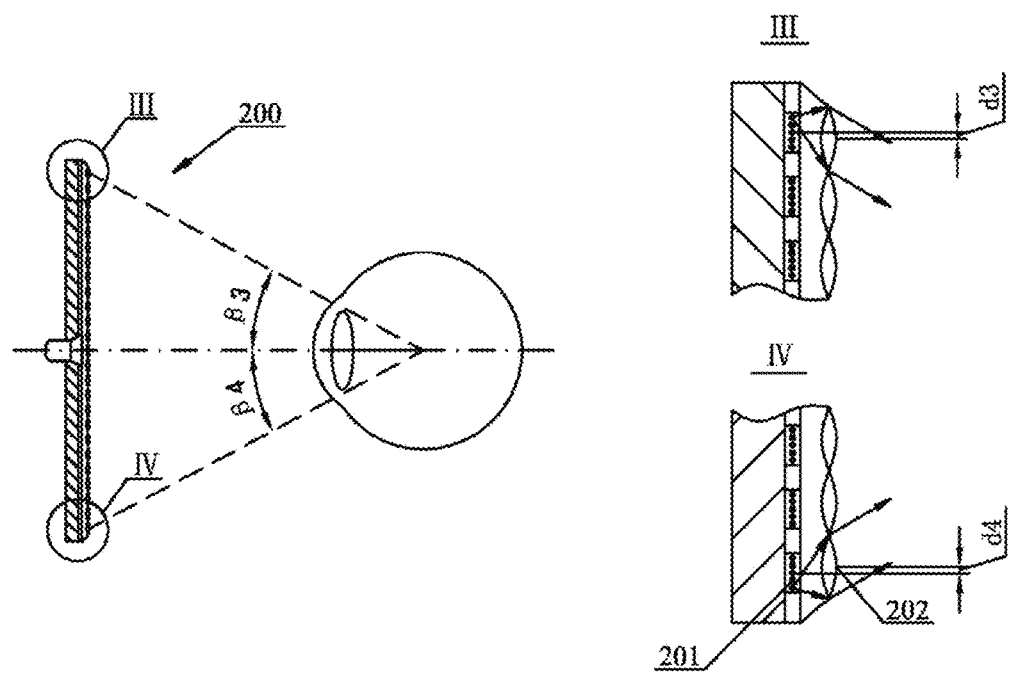

In particular, as shown in FIG. 2A and FIG. 2B, when human eyes turn up and down, it needs to be ensured that image light from all the display regions can enter human eyes. Therefore, the deviated positional relationship of the display region 201 relative to the microlens 202 needs to be adjusted.

Therefore, the image adjustment unit according to the present invention includes a gaze angle detection unit.

The gaze angle detection unit is, for example, a left eye tracker 103 and a right eye tracker 104. Alternatively, the angle may be detected by using other methods. The left and right eye trackers 103 and 104 are infrared cameras configured to determine gaze directions of the left and right eyes of the user by receiving infrared light reflected by the pupil of the eyes of the user. If human eyes are looking at a distant part in a virtual image, the lines of sight of the left and right eyes extend forward in parallel. If human eyes are looking at a near part in a virtual image, the lines of sight of the left and right eyes intersect at the part. The focus position of the lines of sight can be derived by using the left and right eye trackers 103 and 104, as shown in FIG. 1A.

Referring to FIG. 2B, when it is detected by using the eye trackers 103 and 104 that a human eye is looking forward, in an area III at the upper edge of the display screen, the display region 201 deviates upward by a distance d3 relative to the center of the corresponding microlens 202, and in an area IV at the lower edge of the display screen, the display region 201 deviates downward by a distance d4 relative to the center of the corresponding microlens 202, where d3=d4, so that all light refracted through the microlens can enter the eye, as shown by a partially enlarged view of the area III and the area IV in FIG. 2B.

Referring to FIG. 2A, when it is detected by using the eye trackers that a human eye is looking upward, in an area I at the upper edge of the display screen, the display region 201 deviates upward by a distance d1 relative to the center of the corresponding microlens 202, and in an area II at the lower edge of the display screen, the display region 201 deviates downward by a distance d2 relative to the center of the corresponding microlens 202, so that all light refracted through the microlens can enter the eye, as shown by a partially enlarged view of the area I and the area II in FIG. 2A. In this case, because the human eye is looking upward, an angle $\oplus 1$ of inclination of light incident from an upper marginal area to the human eye should be smaller than an angle $\beta 3$ of inclination when the human eye is looking right forward, that is, $\oplus 1<\beta 3$, and an angle $\beta 2$ of inclination of light incident from a lower marginal area to the human eye should be far greater than an angle $\beta 4$ of inclination when the human eye is looking right forward, that is, $\beta 2>\beta 4$. Therefore, in this case, the distance d1 by which the display region 201 deviates relative to the microlens 202 is smaller than the distance d3, and the distance d2 is greater than the distance d4. That is, d1<d3, and d2>d4.

It should be understood that according to the gaze direction of the human eye, all the display regions on the entire display screen deviate correspondingly, and therefore, the display regions are still kept separate from each other and do not overlap. That is, the display region may be opposite to the center of the microlens (for example, the center of the central display region when the human eye is looking right forward will be opposite to the center of the central microlens), or the center of the display region may deviate relative to the position of the center of the corresponding microlens, so that image light from any point on the display region can enter the human eye.

As can be seen from the above description, in the present invention, the display regions do not correspond one-to-one to the pixel units; instead, the display regions correspond one-to-one to the subimages. That is, the display regions are not obtained by dividing the physical structure of the display screen. One pixel unit may serve as part of a display region 1 that displays a subimage 1 at one moment, and serve as part of a display region 2 that displays a subimage 2 at a next moment.

2. Adjustment according to the Visual Acuity State of the User

The image adjustment unit according to the present invention can further adjust, according to the visual acuity state of the user, pixel units in each display region that actually participate in displaying, so that the displayed image can be adaptively adjusted according to the health state of each person's crystalline lens (whether it can normally zoom), the ocular axial length and the focus position of the human eye, enabling the user to observe a complete, clear, gap-free and overlap-free image.

Figure 3A:
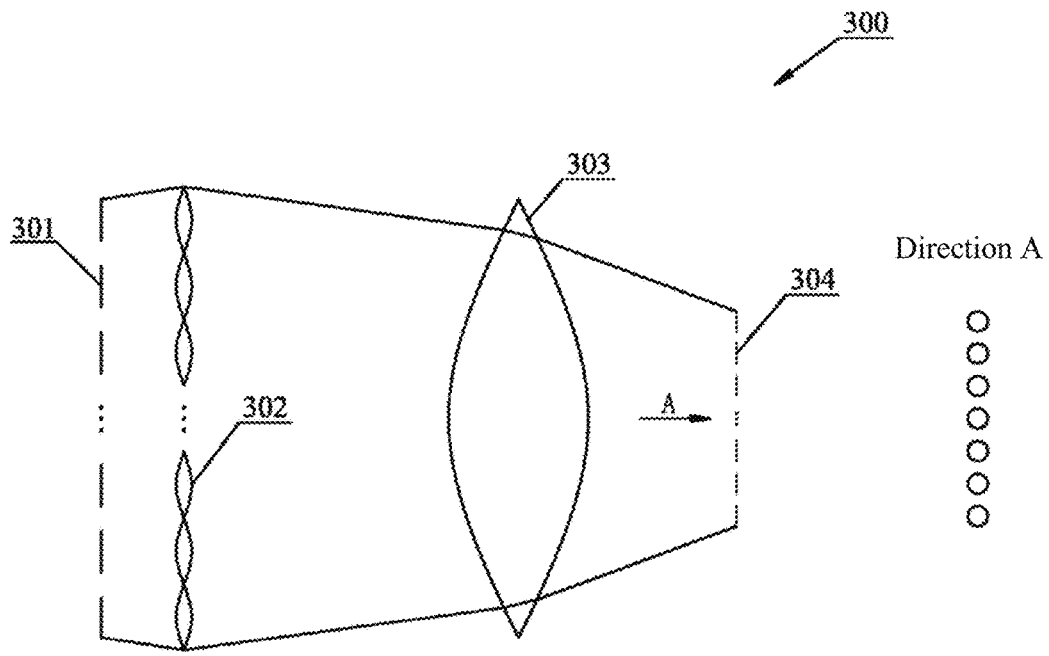
FIG. 3A and FIG. 3B are schematic diagrams respectively illustrating image defects that a user wearing the near-eye display according to the present invention may encounter in a near-sighted or far-sighted state caused by zooming of human eyes.
Figure 3B:
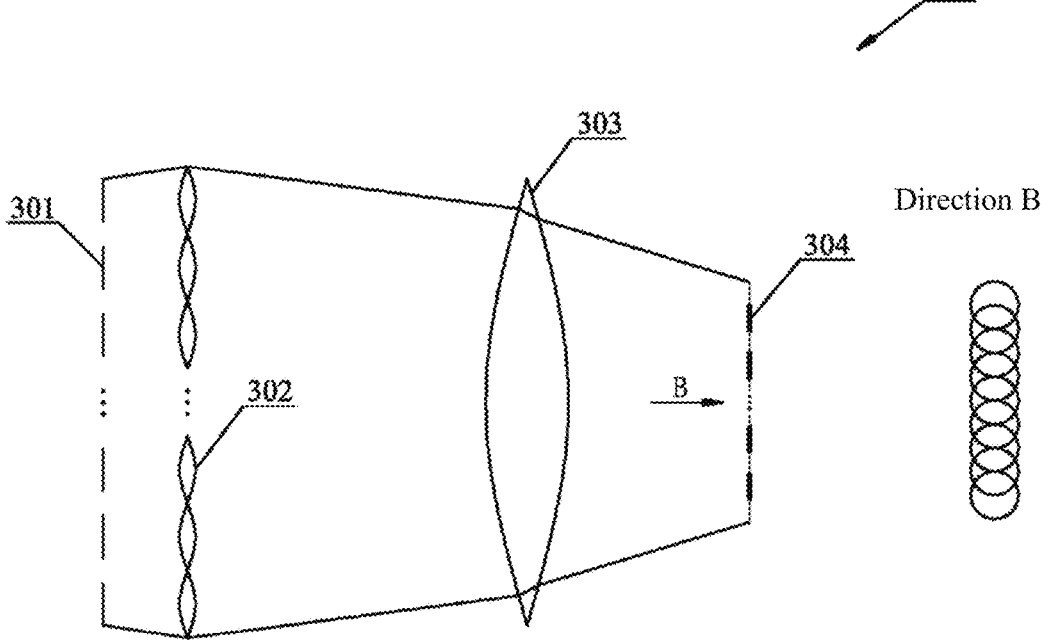

As shown in FIG. 3A, in the near-sighted state, there is a gap between the subimages displayed on the display regions on the display screen 301. As shown in FIG. 3B, in the far-sighted state, there is an overlap between the subimages displayed on the display regions.

Therefore, to resolve the above problems, in the present invention, the image adjustment unit performs in real time the following steps of adjustments.

I. First Adjustment Method:

a) Determine that the user is in a certain visual acuity state. The degree of contraction of the muscle of the lens of the human eye may be detected by using a detector such as an electromyographic sensor. A visual acuity state parameter that the human eye should have at this moment is obtained according to the degree of contraction.

b) Adjust, according to Table 1, the displayed image size of the display region corresponding to visual acuity states. When determining that the user is in a near-sighted state, the image adjustment unit instructs each display region 101a on the display screen to consistently increase the number of pixel units to be displayed to a corresponding number in Table 1, to display a larger single subimage, so that multiple subimages can exactly pass through the microlens array and be focused on the retina of the human eye by the lens of the human eye, so as to jointly form a complete gap-free image. Alternatively, when determining that the user is in a far-sighted acuity state, the image adjustment unit instructs each display region 101a on the display screen to consistently reduce the number of pixel units to be displayed to a corresponding number in Table 1, to display a smaller single subimage, so that the subimages can exactly pass through the microlens array and be focused on the retina of the human eye by the lens of the human eye, so as to jointly form a complete overlap-free image, as shown in FIG. 1B.

TABLE 1

| Displayed image sizes of the display region for different users in different visual acuity states | | | | | | |
|---|---|---|---|---|---|---|
| | far-sighted state 1 | far-sighted state 2 | far-sighted state 3 | . . . | near-sighted state 3 | near-sighted state 2 | near-sighted state 1 |
| user 1 | a11 | a21 | a31 | . . . | b31 | b21 | b11 |
| user 2 | a12 | a22 | a32 | . . . | b32 | b22 | b12 |
| user 3 | a13 | a23 | a33 | . . . | b33 | b23 | b13 |

Note:
1. The displayed image size of each display region may also be construed as the number of pixel units participating in image displaying.
2. The far-sighted state and the near-sighted state are relative descriptions about different visual acuity states of human eyes.

II. Second Adjustment Method:

a) Determine the gaze angle of the human eyes by using the gaze angle detection unit.

b) Adjust, according to Table 2, the displayed image size of the display region corresponding to each gaze angle. When determining that the user is under a near-sighted gaze angle, the image adjustment unit instructs each display region 101a on the display screen to consistently increase the number of pixel units to be displayed to a corresponding number in Table 2, to display a larger single subimage, so that multiple subimages can exactly pass through the microlens array and be focused on the retina of the human eye by the lens of the human eye, so as to jointly form a complete gap-free image. Alternatively, when determining that the user is under a far-sighted gaze angle, the image adjustment unit instructs each display region 101a on the display screen to consistently reduce the number of pixel units to be displayed to a corresponding number in Table 2, as shown in FIG. 1B.

TABLE 2

Displayed image sizes of the display region for different users under different gaze angles

| | far-sighted angle 1 | far-sighted angle 2 | far-sighted angle 3 | ... | near-sighted angle 3 | near-sighted angle 2 | near-sighted angle 1 |
|---|---|---|---|---|---|---|---|
| user 1 | a11 | a21 | a31 | ... | b31 | b21 | b11 |
| user 2 | a12 | a22 | a32 | ... | b32 | b22 | b12 |
| user 3 | a13 | a23 | a33 | ... | b33 | b23 | b13 |

Note:
1. The displayed image size of each display region may also be construed as the number of pixel units participating in image displaying.
2. The far-sighted angle and the near-sighted angle are relative descriptions about different sight distances of human eyes.

As mentioned above, the so-called "near-sighted state or far-sighted state" herein (that is, "visual acuity state of human eye" hereinafter) may be caused by zooming of human eyes, for example, the near-sighted state caused by focusing at a near position and the far-sighted state caused by focusing at a distant position, or may be caused by aberrations or defects (near-sightedness, far-sightedness, etc.) of eyes of an observer. As used throughout this specification, the near-sighted state and the far-sighted state do not particularly refer to myopia and presbyopia.

Therefore, to obtain Table 1 and Table 2, setting or calibration needs to be performed in advance, as described below.

1) The user may enter the diopter of his/her eye by means of an input device. For example, if the user is 100 degrees near-sighted, the user may chose to enter 100 degrees of near-sightedness. The foregoing Table 1 can be obtained based on a pre-stored comparison table between visual acuity states and displayed image sizes of display regions (that is, the number of pixel units in the display region that participate in displaying).

2) The near-eye display 100 according to the present invention may include a visual acuity state calibration unit configured to calibrate the diopter of the eye of the user, so as to calibrate the displayed image size parameter of the display region corresponding to different visual acuity states.

There are multiple calibration methods available to those skilled in the art. Two examples are given here.

Figure 5:
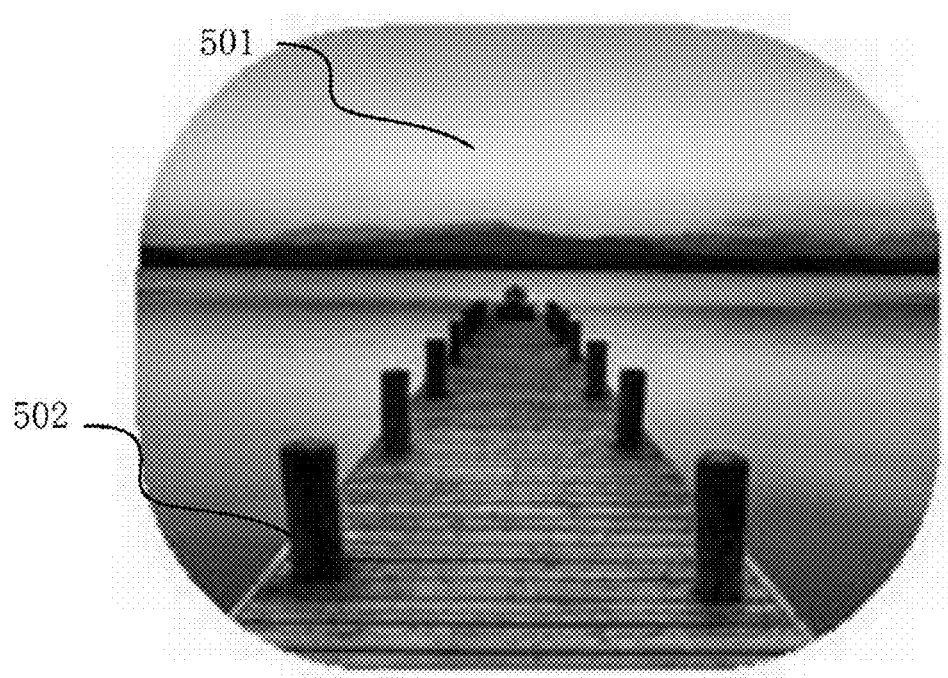
FIG. 5 illustrates an image used for calibration.

1. A first calibration method is as follows:

a) The visual acuity state calibration unit is used to guide the user to focus both eyes to watch a part of a calibration image, usually the farthest part and the nearest part of the image. As shown in FIG. 5, the user is guided to watch the sky 501 and posts 502 on a nearby bridge.

b) It is determined by using the gaze angle detection unit whether gaze directions of left and right eyes of the user have reached predetermined calibration positions.

c) The user provides a feedback about whether there is an image gap or overlap. That is, the user determines whether the image presented to the human eye is complete, gap-free and overlap-free. If it is considered that there is a gap between the image and surrounding images, the number of pixel units in the corresponding display region that participate in displaying of the image at the distance is increased, and a value at this moment is recorded. If it is considered that there is an overlap between the image and surrounding images, the number of pixel units in the corresponding display region 101a that participate in displaying of the image at the distance is reduced, and a value is recorded.

d) Because the displayed image size of the display region linearly changes as the focusing distance changes, displayed image sizes of the display region that correspond to other distances (that is, other visual acuity states) can be obtained through calculation according to the two end values.

In step b), as shown in FIG. 1B, because the perpendicular distance between the human eye and the display screen 101 is fixed, the visual acuity state calibration unit detects the gaze directions of the left and right eyes and an angle α therebetween, and makes the following judgments: a) if α is large, determining that the user is looking at a near part in a virtual image; or if α is small or even 0 (that is, both eyes of the user are looking forward in parallel), determining that the user is looking at a distant part in a virtual image. Thereby, the display region that displays the image that the user is looking at can be determined on the display screen 101. For example, as shown in FIG. 5, when the user is looking at the distant sky 501, it is detected by using the eye trackers that the lines of sight of the left and right eyes are parallel, indicating a far-sighted state; when the user is looking at a nearby post 502, it is detected by using the eye trackers that the lines of sight of the left and right eyes intersect, indicating a near-sighted state.

2. A second calibration method is as follows:

Alternatively, the degree of contraction of the muscle of the lens of the human eye may be detected by using a detector such as an electromyographic sensor. The foregoing Table 1 can be obtained based on a standard comparison table between visual acuity states and display region sizes (the number of pixel units).

By means of the image adjustment method according to the present invention, the near-eye display according to the present invention can be directly applied to persons in different visual acuity states, and can adjust the image size according to the real-time focus position of eyes of the user, so as to enable the user to obtain an optimal visual effect.

The near-eye display of this embodiment is also applicable to a single eye.

The accompanying drawings are merely schematic and are not drawn to scale. It should be understood that although the present invention has been described with reference to preferred embodiments, the scope of protection of the present invention is not limited to the embodiments described herein.

Based on the description and practice of the present invention as disclosed herein, other embodiments of the present invention are readily conceived of and understood to those skilled in the art. The description and embodiments are provided for exemplary purpose only. The real scope and spirit of the present invention are defined by the claims.

What is claimed is:

1. A near-eye display, comprising a human eye-oriented display screen, a microlens array located on the side of the display screen close to human eyes, and an image adjustment unit, wherein the display screen has a plurality of display regions that are separate from each other, each display region correspondingly displays a subimage, and the subimages displayed on the display regions is combined as a complete, gap-free and overlap-free image to be presented to a user;

the microlens array focuses the image displayed on the display screen into a near-eye image that can be clearly seen by human eyes, each microlens being corresponding to one of the display region; and the image adjustment unit adjusts in real time size of the displayed image of each display region according to a visual acuity state of the user, so that each display region displays a larger single subimage when a human eye has a short focal length, and each display region displays a smaller single subimage when a human eye has a long focal length, and/or the image adjustment unit moves in real time the position of each display region according to a gaze direction of the user, so that the subimage displayed on each display region can be refracted into the human eye through the microlens array regardless of the gaze direction of the user;

wherein the image adjustment unit comprises a human-eye gaze direction detection unit configured to detect in real time a gaze direction of a human eye and a calibration unit configured to perform the following steps of calibrations for a displayed image size parameter of the display region corresponding to different gaze angles:
  a) guiding, by using the calibration unit, the user to focus both eyes to watch a farthest part and a nearest part of a calibration image, the farthest part and the nearest part being used as two calibration positions;
  b) detecting, at the two calibration positions, gaze directions of left and right eyes of the user by using the human-eye gaze direction detection unit, to determine whether a position to which the user pays attention has reached the two calibration positions;
  c) at the two calibration positions, respectively sending a request for requesting the user to determine whether there is an image gap or overlap, receiving feedback information, and making the following judgments: if determining according to a feedback that there is a gap between the image and surrounding images, increasing a number of pixel units in a display region at each of the calibration positions, and recording a value at this moment and if determining according to a feedback that there is an overlap between the image and surrounding images, reducing the number of pixel units in the corresponding display region that participate in displaying of the image at a distance, and recording a value; and
  d) obtaining, through calculation according to the two end values, displayed image sizes of the display region that correspond to other gaze angles.

2. The near-eye display according to claim 1, wherein the gaze direction detection unit comprises an eye tracker configured to determine in real time the gaze direction of the user according to a received beam that is reflected from the pupil of an eye of the user.

3. The near-eye display according to claim 1, wherein the image adjustment unit performs in real time the following steps of adjustments:
  a) determining a gaze angle between human eyes by using the human-eye gaze direction detection unit; and
  b) adjusting the size of displayed image of the display regions corresponding to each gaze angle:
  when determining that the user is under a near-sighted gaze angle, the image adjustment unit instructs each display region on the display screen to consistently increase the number of pixel units to be displayed; or
  when determining that the user is under a far-sighted gaze angle, the image adjustment unit instructs each display region on the display screen to consistently reduce the number of pixel units to be displayed.

4. The near-eye display according to claim 1, wherein the image adjustment unit comprises a visual acuity state detection unit configured to detect in real time a focal length of a human eye.

5. The near-eye display according to claim 4, wherein the image adjustment unit performs in real time the following steps of adjustments:
  a) determining, by using the visual acuity state detection unit, that the user is in a certain visual acuity state;
  b) adjusting the size of the displayed image of the display regions corresponding to visual acuity states:
  when determining that the user is in a near-sighted visual acuity state, the image adjustment unit instructs each display region on the display screen to consistently increase the number of pixel units to be displayed; or
  when determining that the user is in a far-sighted visual acuity state, the image adjustment unit instructs each display region on the display screen to consistently reduce the number of pixel units to be displayed.

6. The near-eye display according to claim 1, wherein the near-eye display is located on one side of human eyes, and reflects the image to human eyes by using a reflecting mirror disposed in front of human eyes.

7. The near-eye display according to claim 6, wherein the reflecting mirror is a semi-transmissive semi-reflective mirror.

8. A near-eye display, comprising a human eye-oriented display screen, a microlens array located on the side of the display screen close to human eyes, and an image adjustment unit, wherein the display screen has a plurality of display regions that are separate from each other, each display region correspondingly displays a subimage, and the subimages displayed on the display regions is combined as a complete, gap-free and overlap-free image to be presented to a user;

the microlens array focuses the image displayed on the display screen into a near-eye image that can be clearly seen by human eyes, each microlens being corresponding to one of the display region; and the image adjustment unit adjusts in real time size of the displayed image of each display region according to a visual acuity state of the user, so that each display region displays a larger single subimage when a human eye has a short focal length, and each display region displays a smaller single subimage when a human eye has a long focal length, and/or the image adjustment unit moves in real time the position of each display region according to a gaze direction of the user, so that the subimage displayed on each display region can be refracted into the human eye through the microlens array regardless of the gaze direction of the user;

wherein the image adjustment unit comprises a visual acuity state detection unit configured to detect in real time a focal length of a human eye and a calibration unit configured to perform the following steps of calibrations for a displayed image size parameter of the display region corresponding to different focal lengths:

a) guiding, by using the calibration unit, the user to focus both eyes to watch a farthest part and a nearest part of a calibration image, the farthest part and the nearest part being used as two calibration positions;

b) respectively detecting, at the two calibration positions, focal lengths of human eyes by using the visual acuity state detection unit; and c) obtaining, through calculation according to the two end values, displayed image sizes of the display region that correspond to other focal lengths.

* * * * *